Patented July 31, 1951

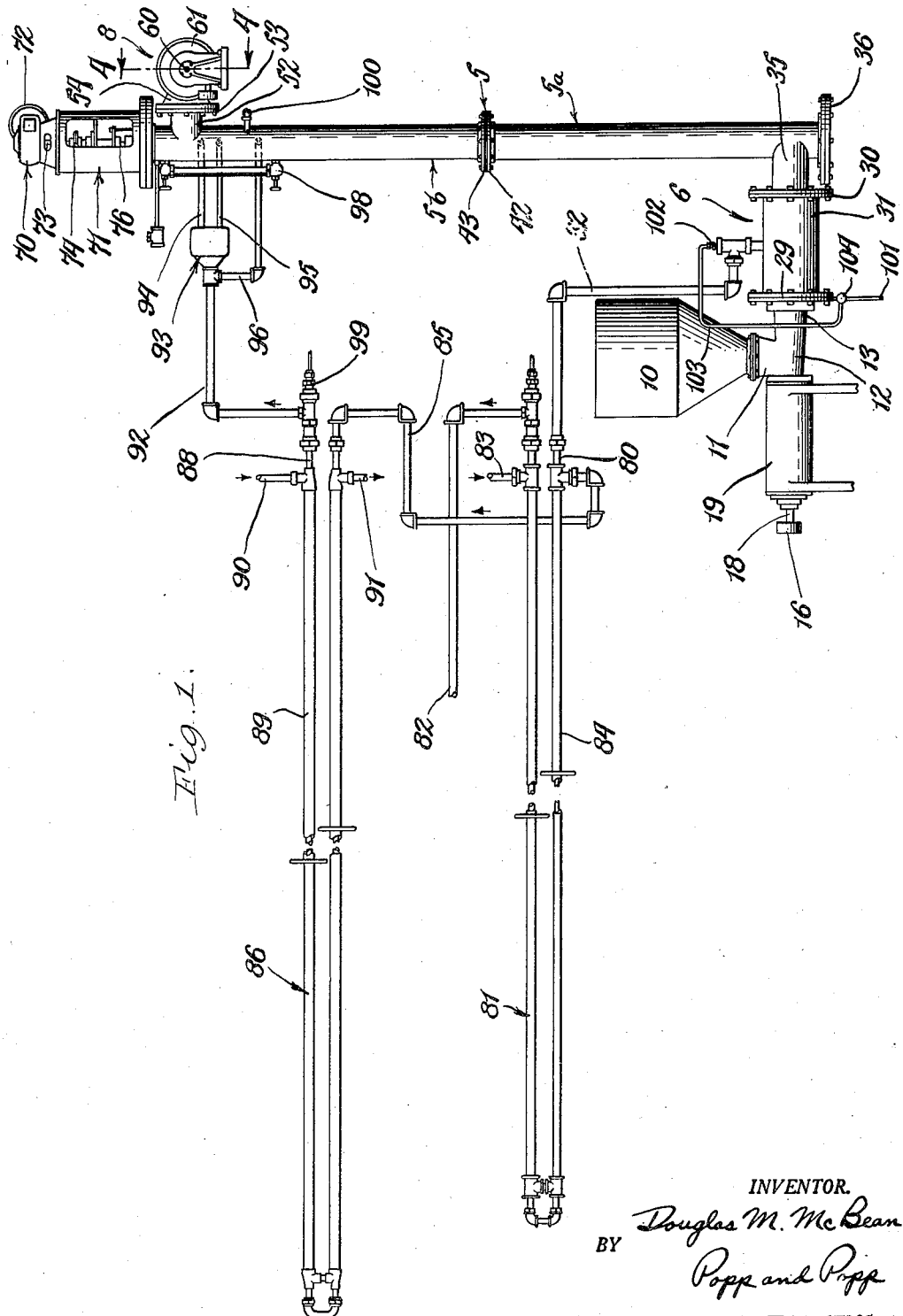

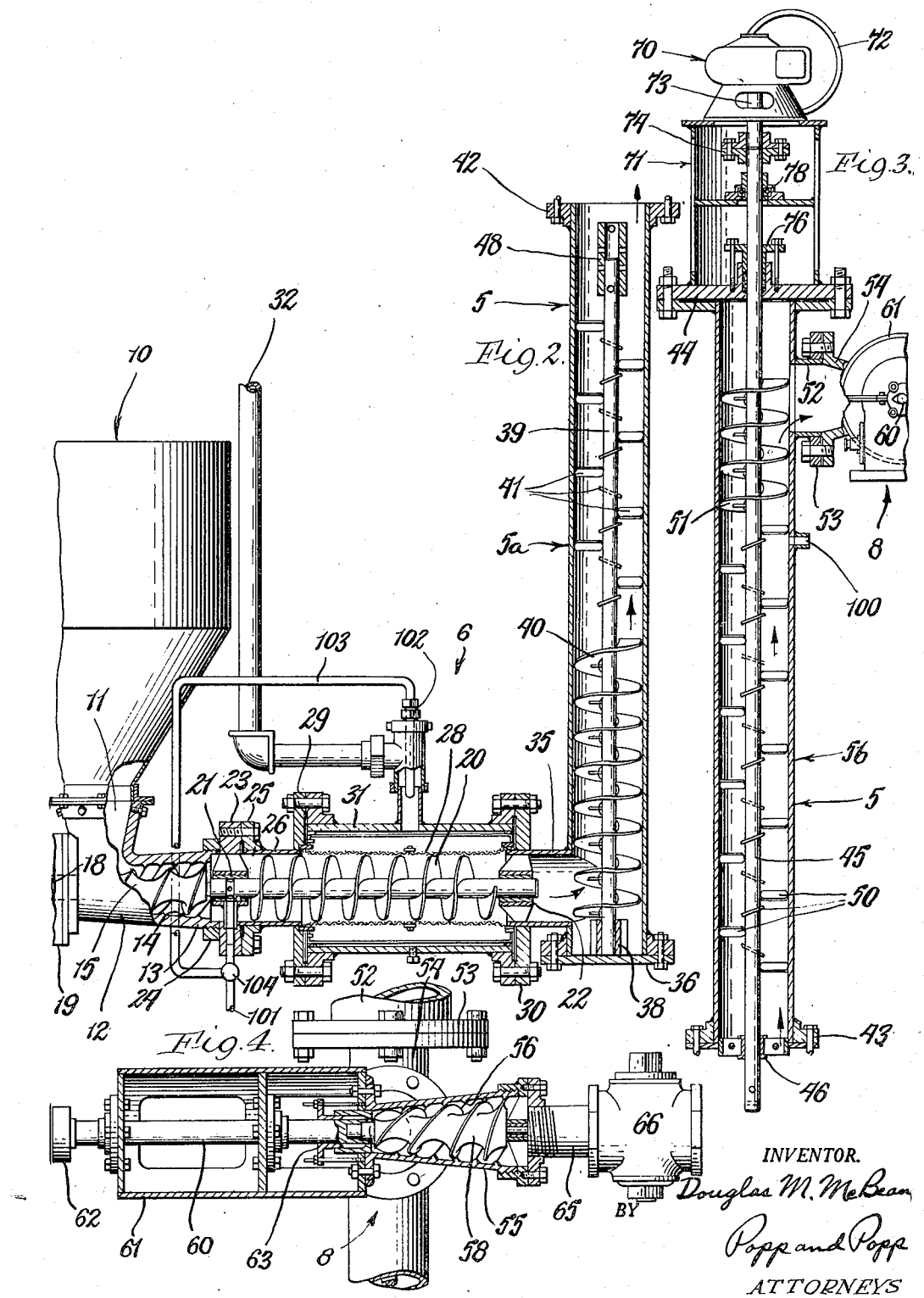

2,562,563

UNITED STATES PATENT OFFICE 2,562,563

EXTRACTOR

Douglas M. McBean, Rochester, N. Y.

Application May 21, 1947, Serial No. 749,561

3 Claims. (Cl. 99—289)

1

This invention relates to an extractor and more particularly to the extraction of the water soluble constituents from granular material such as the extraction of coffee liquor from roasted ground coffee, the coffee liquor concentrate extracted in accordance with the present invention being capable of being mixed with starch and passed through a spray dryer so as to provide a powdered concentrate capable of being mixed with hot water to provide hot coffee for drinking.

One of the principal objects of the present invention is to preserve the volatile constituents of the roasted ground coffee in the coffee liquor so that the end product, when mixed with hot water, has the same flavor, color, taste, aroma and stimulating effect as freshly brewed coffee.

Another object of the invention is to provide an extractor in which the maximum amount of water soluble constituents are extracted from the granular material being processed.

Another object is to provide such an extractor in which the liquor leaving the extractor is concentrated to the maximum degree with the water soluble constituents being extracted, thereby to facilitate drying of the concentrate and minimize loss of the volatile constituents.

Another object of the invention is to provide such a coffee extractor in which the ground dry coffee is fed directly into the extractor without preparation, other than roasting and grinding, and in which adequate provision is made for the relief of the copious quantities of gas which are evolved when such coffee is initially brought in contact with hot water.

Another object of the invention is to provide such an extractor in which the extraction is effected under elevated temperatures and pressures and in which adequate provision is made against the escape of liquor from the apparatus or loss of pressure.

Another object of the invention is to provide such an extractor in which the granular coffee is fed to the extractor and removed therefrom as a compact mass to maintain the desired pressures within the apparatus, but in which the ground coffee is attenuated and subjected to agitation, as well as to a counterflow movement of the water, to insure the maximum separation of the water soluble constituents.

Another object is to provide such an extractor which operates with a continuous flow of both the granular material and the water used for extraction and which has high capacity.

Another object of the invention is to provide such apparatus in which the conditions of time,

2 temperature, water level and the amounts of materials fed to the apparatus are automatically controlled thereby to reduce the necessity for supervision to a minimum.

Another object is to provide such an extractor which is economical in its operation and which will stand up under conditions of severe and constant use without getting out of order or requiring repairs.

Other objects and advantages of the invention will appear from the following description and drawings, in which:

Fig. 1 is a side elevational view of a coffee extractor embodying the present invention.

Fig. 2 is a fragmentary enlarged vertical section, through the lower part of the extractor shown in Fig. 1, parts being shown in elevation.

Fig. 3 is a view similar to Fig. 2 showing the upper part of the extractor.

Fig. 4 is a vertical section, partly in elevation, taken on line 4—4, Fig. 1.

The extractor embodying the present invention includes a tubular tower 5 having a lower horizontal leg 6 through which the ground roasted coffee is fed into the tower, the grounds being removed from the upper end of the tower by a discharging device indicated generally at 8. Hot water is fed into the upper end of the tower and flows countercurrent to the granular coffee and is relieved in the form of a concentrated liquor from the lower horizontal leg 6. Provisions are made for maintaining the proper flow of materials, pressures, temperatures and to provide the degree of agitation necessary to obtain the maximum amount of water soluble constituents with a minimum loss of the volatile constituents.

The numeral 10 represents an open hopper in which a substantial quantity of freshly roasted and ground coffee is maintained. This dry ground coffee feeds from the hopper 10 into the upstanding inlet 11 of a feed screw housing 12, the outlet 13 of this housing being in the form of an enlarging taper and having internal screw threads 14 which coact with a tapered screw 15 journaled therein. The screw 15 can be turned in any suitable manner, as by the pulley 16 shown, this pulley being shown as fast to a drive shaft 18 journaled in a barrel-like support 19 for the feed screw casing and hopper and operatively connected with the screw 15. The thread of the screw 15 coacts with the threads 14 of the casing in the manner of a meat grinder, to compress the dry ground roasted coffee withdrawn from the hopper and to feed it as a compact mass through the outlet end of the feed screw casing 15 without danger of leakage of the concentrated liquid which is maintained under pressure at the outlet side of this feed screw casing 12.

Fast to the end of the feed screw 15 is a helical screw 20 which is journaled at one end in a bearing 21 and at its opposite end in a bearing 22. The bearing 21 is supported by a spider 23 carried by a collar 24 screwed on the discharge end of the tapered feed screw casing 12. To the spider 23 is bolted the flange 25 of a sleeve 26, this sleeve closely fitting the convolutions of the screw 20.

This screw is also embraced by a closely fitting cylindrical screen 28 which can be made of one or more sections and which is supported by the end heads 29 and 30 of an enlarged cylinder 31. This cylinder is provided at its upper side with an outlet line 32 for the liquid concentrate and also for the gases which are evolved upon bringing the ground material in contact with the water. With coffee copious quantities of carbon dioxide are so evolved and the enlarged cylinder 31 permits the ready escape of these gases.

The end head 30 is fast to a tube 35 which leads into the bottom of the lower section 5a of the tower 5. This lower section 5a of the tower is closed by an end head 36 which supports a vertical bearing 38 for a vertical shaft 39 arranged concentrically within the tower. On the lower part of this shaft 39 is mounted a helical blade or conveyer 40, the shaft 39 being rotated so that the coffee solids are propelled upwardly by this helical conveyer 40. The helical conveyer 40 is of such pitch and rotated at such speed, with reference to the pitch and speed of rotation of the helical conveyer 20, that the solid materials of the coffee are spread out to obtain greater contact with the water which is flowing downwardly through the tower 5. Above the helical flight 40 the shaft 39 is provided with a series of radially extending inclined paddles 41 which are shown as arranged at an angle to provide an upwardly propelling effect. Since the movement of the hot water is downwardly, these paddles serve to propel the granular material upwardly and also serve to agitate the liquid and granular material to facilitate the extraction of the water soluble constituents from the granular material.

The upper end of the lower section 5a of the tower is provided with an end flange 42 to which is secured the lower end flange 43 of the upper section 5b of the tower. This upper section 5b of this tower is provided with an upper end head 44 in which is journaled a shaft 45. The lower end of this shaft is shown as journaled in a bearing 46 and its lower extremity is coupled to the upper end of the shaft 39 by means of a coupling 48 which couples the two shafts 39 and 45 so as to compel them to turn in unison.

The lower part of the shaft 45 is provided with a series of radially extending paddles 50 which are shown as being similar to the paddles 41 on the shaft 39. Near the upper end of the tower the shaft 45 carries a helical conveyer 51 which conveys the grounds upwardly.

At the upper end of the helical conveyer 51 the upper section 5a of the tower is formed to provide a laterally extending discharge conduit 52 having a flange 53 to which is bolted the inlet 54 of a discharge screw casing 55. The body of this discharge screw casing is of tapering form having internal screw threads 56 which coact with a tapered screw 58 journaled in this casing. The conduit 52 leads laterally into the small end of the tapered chamber formed by the discharge screw casing 55 and the screw 58 is shown as turned by a drive shaft 60 journaled in a supporting barrel 61 and turned by means of a pulley 62. A suitable stuffing box 63 is provided between the drive shaft 60 and the discharge screw casing 55 and the screw 58 is turned so as to draw the grounds from the discharge conduit 52 and compact them against the outlet 65 of the discharge screw casing 55. To insure that the grounds are discharged under pressure a gate valve 66 is provided in the discharge line 65, this gate valve being regulated to provide the desired back pressure of the grounds against the discharge screw 58.

The shaft 39, 45 can be turned in any suitable manner as by the provision of a reducing gear mechanism 70 on a cylindrical support 71 mounted on the upper end head 44 of the tower. This reducing gear mechanism is shown as driven from the pulley 72 and as having its driven shaft 73 connected by a coupling 74 with the upper end of the shaft 45. A stuffing box 76 is shown as provided between the end head 44 and the shaft 45 to permit of maintaining the desired pressure within the tower and a friction bearing 78 is shown as carried by the support 71 and as journalling the upper end of the shaft 45.

The processing is carried out with water maintained at an elevated temperature and under a corresponding pressure. To conserve heat the feed water is first passed in heat exchange relation to the outgoing concentrating liquid. To this end the concentrated liquid discharge pipe 32 connects with the central tube 80 of a shell and tube heat exchanger 81 and passes out through a liquid concentrate outlet line 82 for further processing, this further processing including admixture of the liquid concentrate with starch and drying in a spray dryer, the starch serving to retain the volatile constituents in the end product. The feed water is introduced from a feed line 83 to the shell 84 of the shell and tube heat exchanger 81 and passes in counterflow relation to the hot liquid concentrate so as to absorb heat therefrom. From the heat exchanger 81 the feed water passes through a line 85 to a shell and tube heat exchanger 86 where it is passed in heat exchange relation with steam. The feed water passes through the tube 88 of the shell and tube heat exchanger 86 and the steam is introduced into the shell 89 thereof from a steam inlet 90, the condensate outlet being designated at 91.

The feed water outlet line 92 connects with a float valve indicated generally at 93. This float valve has its float chamber connected by equalizing pipes 94 and 95 with the upper end of the tower 5 so that the level within the tower 5 is maintained at the same level as that maintained in the chamber of the float valve 93. The feed water, under control of the float valve 93, is admitted to the tower through a line 96. The level of liquid so maintained within the tower 5 can be observed through a sight glass 98.

The temperature of the liquid in the upper end of the tower 5, for coffee extraction, is preferably in the order of 260° F. and maintained under a pressure of approximately 27 pounds in the upper end of the tower. To this end steam is supplied to the inlet 90 of the heat exchanger 86 at a temperature in the order of 330° F., this being shown as maintained by a thermostat 99 in the feed water outlet line from this thermostat through a suitable steam control valve (not shown). To maintain the necessary pressure within the upper end of the tower compressed air can be supplied through an inlet 100 in the upper end of the tower, this pressure being maintained at, say, 27 pounds to prevent flashing of the hot water. This water flows down through the tower and out through the conduit 35, screen 28 and outlet line 32 to the heat exchanger 81 from which it passes through the line 82 for further processing.

The dry ground coffee admitted from the hopper 10 is relatively cool and to rapidly bring this coffee up to the desired temperature for the extraction of its water soluble constituents, it is initially heated by introducing steam from a steam line 101 into the bearing 21 at the lead end of the screw 20. This steam is under control of a thermostat 102 which, through a line 103, controls the steam valve 104. In addition to keeping the bearing 21 flushed, this steam escapes through the compacted dry coffee being forced into the apparatus by the feed screw 15 and hence rapidly heats this coffee to the desired temperature for extraction of its water soluble constituents by the water. Through the thermostat 102 a close control of this preheating effect can be maintained.

In the operation of the extractor, the hot water is passed countercurrent to the granular material from which the water soluble constituents are being extracted. By such counterflow the fresh water is brought in contact with the spent grounds so as to extract the maximum water soluble constituents therefrom and the liquid increases in strength as the solids decrease in strength throughout the apparatus. The feed water from the line 83 passes through the heat exchanger 81 where it flows in heat exchange relation to the hot leaving concentrated liquid so that its temperature is raised to, say, 180° F. in the line 85. It then passes in heat exchange relation to steam in the steam heater or heat exchanger 86 where its temperature is raised to, say, 260° F. on entering the upper end of the tower 5 through the lines 92 and 96 under control of the float valve 93 which maintains a predetermined level in the tower 5, its float chamber being connected to the tower by the equalizing lines 94 and 95. Air, under pressure, can also be admitted through the line 100 into the tower 5 so as to maintain the pressure in the upper end of the tower at or above the flash point of the water at this temperature of 260° F. This water flows down through the tower 5 in opposition to the helical conveyer 51, paddles 50 and 41 and helical conveyer 40, these elements mounted on the shaft 39, 45 serving to move the granular material in the opposite direction and to agitate the mixture of water and granular material. At the bottom of the tower the hot water passes out through the conduit 35 and through the compacted mass of granular material being conveyed through the tubular screen 28 by the helical conveyer 20. In its course this water becomes highly concentrated with the water soluble constituents of the coffee or other material being processed and this concentrated liquid passes out from the enlarged cylinder 31 through the outlet line 32 to the heat exchanger 81 from which it passes through the outlet line 82 for further processing. Such processing, with coffee, comprises admixture with starch and spray drying to provide a powdered concentrate capable of being mixed with hot water to provide drinkable coffee.

A quantity of freshly roasted and ground coffee is maintained in the hopper 10. This coffee is drawn downwardly into the feed screw casing 12 by the coaction of its tapered screw 15 with the threads 14 in the tapered screw chamber thereof. This coaction serves to compact the ground coffee into a solid mass and to force it into the tubular section 26 where it is picked up by the helical conveyer 20 and conveyed as a solid mass through the tubular screen 28. In order to preheat the dry entering ground coffee to the temperature necessary to dissolve the maximum water soluble constituents therefrom, steam is introduced through a line 101 under control of the thermostat 102 into the bearing 21 at the lead end of the helical conveyer 20. This steam flushes the bearing 21 and also escapes through the compacted mass of entering coffee solids so as to bring the temperature thereof to effect the preheating desired. On being forced, as a compacted mass, through the tubular screen 28 the coffee comes in contact with the liquid flowing in a reverse direction through this screen. This liquid is highly concentrated but the ground coffee is fresh so that a substantial solution of the water soluble constituents of the ground coffee is effected by this initial contact of the coffee with the liquid and the liquid is concentrated to a high degree, thereby to facilitate the further processing of the liquid concentrate by admixture with starch and spray drying.

The helical conveyer 20 forces the ground coffee through the conduit 35 into the bottom of the tower 5. At the bottom of the tower the ground coffee is picked up by the helical conveyer 40 and moved upwardly through the tower, the shaft 39 of this helical conveyer 40 being rotated at such speed as to attenuate the ground coffee and to bring the granules thereof in intimate contact with the hot water which is flowing downwardly through the tower. The shafts 39 and 45 are coupled together and as the ground coffee rises in the tower 5 it is subjected to the agitating action of the paddles 41 and 50 on these shafts, these paddles being inclined so as to convey the granular coffee upwardly in opposition to the downward flow of the water.

At the upper end of the tower the ground coffee is picked up by the helical conveyer 51 and conveyed above the level of the water therein into the outlet conduit 52. This outlet conduit leads to the reduced end of the discharge screw casing 55 and the discharge screw 58 therein rotates to compact the spent coffee against the gate valve 66 in its outlet line 65. By regulation of this gate valve the desired degree of compaction of the spent coffee can be maintained to insure against the escape of pressure from the tower 5.

A feature of the invention resides in the provision of the enlarged cylinder 31 surrounding the tubular screen 28 through which the ground coffee is introduced to the liquid by the helical conveyer 20. Thus, with coffee, at such introduction of freshly ground roasted coffee to hot water a copious quantity of carbon dioxide is released. This carbon dioxide freely escapes to the enlarged cylindrical chamber 31 and through its outlet line 32.

From the foregoing it will be seen that the present invention provides a continuous extractor for use with comminuted solids in extracting the water soluble constituents therefrom by means of hot water. It will further be seen that by the counterflow relation of the water and solid materials the maximum extraction is obtained, particularly with the agitation and attenuation provided by the vertical shafts 39 and 45 and their helical conveyers and paddles. It will further be seen that the solid materials are introduced into the apparatus in dry form and without danger of leakage of the concentrate and that also the spent grounds are removed from the apparatus without danger of loss of pressure. In the concentrating apparatus the solid materials are adequately preheated to bring them up to the desired initial temperature and also adequate provision is made for the relief of the carbon dioxide which is generated upon initial contact of ground coffee with hot water.

It will also be seen that the apparatus is readily subject to complete automatic control both to relieve the necessity for close supervision and also to insure a produce having a high degree of uniformity.

I claim:

1. In an extractor of the character described, a conduit having a granular material inlet at one end and a granular material outlet at its opposite end, a screw casing secured to and having a tapered, internally threaded bore with its large end communicating with said granular material inlet, a rotary tapered screw in said tapered bore, means for feeding dry granular material to the small end of said tapered screw and bore to be compacted thereby and forced into said conduit, a second screw casing secured to and having a tapered, internally threaded bore with its small end communicating with said granular material outlet, a rotary tapered screw in said bore of said second screw casing, means for conveying said granular material through said conduit to said granular material outlet and the small end of the bore of said second screw casing to be compacted therein, a liquid inlet to said conduit adjacent said granular material outlet, and a liquid outlet from said conduit adjacent said granular material inlet whereby said granular material and liquid flow in counterflow relation through said conduit.

2. In a continuous extractor of the character described having a conduit having a granular material inlet at one end and a granular material outlet at its opposite end, means forcing a continuous compacted stream of said granular material through said granular material inlet into said conduit, means forcing a continuous compacted stream of said granular material through said outlet and from said conduit, a liquid inlet to said conduit adjacent said granular material outlet, a liquid outlet from said conduit adjacent said granular material inlet whereby said granular material and liquid flow in counterflow relation through said conduit, the combination therewith of means for applying heat and pressure, comprising means for heating the liquid admitted to said conduit to a temperature substantially above the atmospheric boiling point thereof, means maintaining a pressure in said conduit sufficiently high to prevent flashing of the liquid therein, and means preheating the granular material admitted through said granular material inlet, comprising a stream line opening into the compacted stream of granular material passing through said granular material inlet and a thermostat responsive to the temperature of the liquid leaving said liquid outlet and controlling the flow of steam through said steam line.

3. In a continuous extractor of the character described having a tubular conduit having a granular material inlet at one end and a granular material outlet at its opposite ends, means forcing a continuous compacted stream of said granular material through said granular material inlet, a rotary screw conveyer journaled in bearings in said conduit and with one of said bearings arranged adjacent said granular materials inlet, means forcing a continuous stream of said granular material through said granular material outlet and from said conduit, a liquid inlet to said conduit adjacent said granular material outlet, and a liquid outlet from said conduit adjacent said granular material inlet whereby said granular material and liquid flow in countercurrent relation through said conduit, the combination therewith of means for applying heat, comprising means heating the liquid supplied to said liquid inlet, and means preheating said granular material comprising a steam line communicating with said one of said bearings and supplying steam through said one of said bearings to the granular material entering said conduit.

DOUGLAS M. McBEAN.

REFERENCES CITED

The following references are of record in the file of this patent:

UNITED STATES PATENTS

| Number | Name | Date |
| --- | --- | --- |
| 930,909 | Wiegand | Aug. 10, 1909 |
| 1,409,123 | Simonton | Mar. 7, 1922 |
| 1,793,465 | Coahran | Feb. 24, 1931 |
| 1,813,575 | Janecke et al. | July 7, 1931 |
| 1,821,934 | Feldheimer | Sept. 8, 1931 |
| 2,015,832 | Ahlqvist | Oct. 1, 1935 |
| 2,183,837 | Hamilton | Dec. 19, 1939 |
| 2,250,976 | VanDijck | July 29, 1941 |
| 2,381,965 | Berry | Aug. 14, 1945 |

FOREIGN PATENTS

| Number | Country | Date |
| --- | --- | --- |
| 19,259 | Holland | Jan. 15, 1929 |
| 77,877 | Sweden | July 25, 1933 |
| 583,943 | Germany | Mar. 24, 1934 |